Sept. 26, 1961     F. A. OYHUS     3,001,406

ACCELEROMETER

Filed Dec. 5, 1952

INVENTOR
FREDERICK A. OYHUS

BY
*G. D. O'Brien*
*Q. Baxter Warner*
ATTORNEYS 3,001,406
ACCELEROMETER
Frederick A. Oyhus, Rockville, Md., assignor to the United States of America as represented by the Secretary of the Navy
Filed Dec. 5, 1952, Ser. No. 324,188
7 Claims. (Cl. 73—497)

This invention relates to accelerometers. In more detail it relates to a potentiometer type accelerometer for use in telemetering equipment carried in guided missiles during test flights.

In tests of guided missiles, a record of the accelerations of the missile while in flight is necessary in order to evaluate the missile's performance. Accelerations of the magnitude encountered in missile flights impose severe mechanical strains on the instruments employed as acceleration pickups. Furthermore, these high accelerations require that the motion of the instruments' moving parts be effectively damped. The instruments must at the same time remain sufficiently sensitive and accurate to provide reliable indications of changes in velocity. Thus, in addition to an effective damping system, maximum amplification of the mechanical motion of the seismic mass is desirable.

The incorporation of a damping mechanism that utilizes damping fluid introduces several possible sources of error into the instrument. These include changes in volume of the damping fluid due to changes in temperature and external pressure. Other sources of error include the changes in the viscosity of the damping fluid due to changes in its temperature.

It is an object of the invention to provide an improved accelerometer of the potentiometer type for producing an indication of the accelerations and decelerations of bodies moving at high speeds.

It is another object of the invention to provide an improved accelerometer of the named type that is sensitive and accurate.

It is a further object of the invention to provide a potentiometer type accelerometer having an effective damping system.

It is an additional object of the invention to provide an accelerometer having a damping system that is independent of changes in viscosity and volume of the damping fluid due to changes in temperature.

Other objects and many of the attendant advantages of this invention will be readily appreciated as the same becomes better understood by reference to the following detailed description when considered in connection with the accompanying drawings wherein.

Briefly, the accelerometer of the present invention comprises a seismic mass mounted for restrained pivotal motion in a casing that is filled with damping fluid. The mass moves against the damping action of a pair of bellows filled with damping fluid that is adapted to flow through an orifice which compensates for changes in viscosity of the damping fluid due to temperature changes. The motion of the mass is translated, with amplification, into the motion of a potentiometer contact. An evacuated bellows is provided in the casing to compensate for the changes in volume of the damping fluid.

Figure 1:
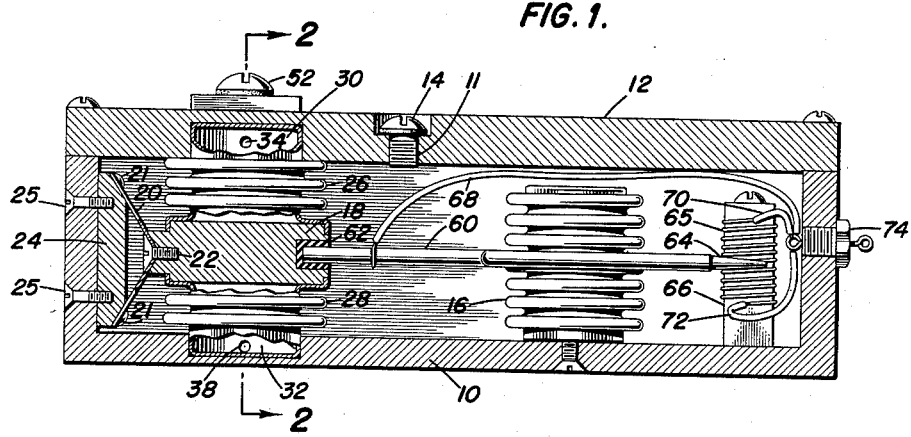
FIG. 1 is a vertical sectional view along the longitudinal axis of one form of an accelerometer made in accordance with the invention, some parts being shown in elevation.

Referring to FIG. 1 of the drawing, the accelerometer has a rectangular casing 10 that includes a removable top cover 12. The entire casing may be of duralumin, or a similar strong, lightweight material. A hole 11 closed by a screw 14 is provided in the top cover 12 for filling the casing with damping fluid. A silicone damping fluid may be employed. The casing 10 is carefully sealed to prevent leakage or creep of the damping fluid, and to render the instrument insensitive to changes in exterior pressure. An evacuated bellows 16 is mounted within the casing 10 to compensate for changes in volume of the damping fluid due to changes in its temperature.

A seismic mass 18 is mounted within the casing 10 by means of an angle spring 20, the mass being attached to the spring by means of a flat-head screw 22. Any mounting arrangement that will provide approximately a point center of rotation for the mass can be used; the one described and shown is illustrative only. The legs of the angle spring 20 are attached by screws 21 to a mounting block 24 that is also attached by screws 25 to an end wall of the casing 10.

Figure 2:
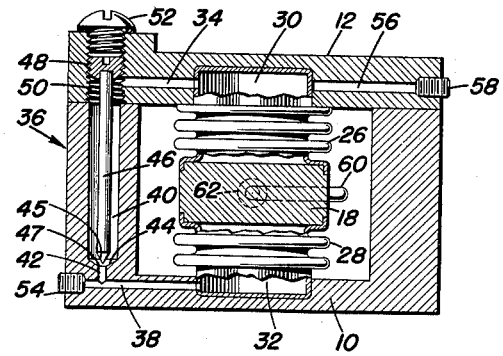
FIG. 2 is a sectional view along line 2—2 of FIG. 1, parts being shown in elevation.

The damping system for the mass includes identical metallic bellows 26 and 28 which are sealed to the top and bottom, respectively, of the mass. The chamber 30, which is integral with the upper bellows 26, is received in an aperture provided in the top 12 of the casing 10. Similarly, the chamber 32 associated with the lower bellows 28 is received in an aperture provided in the bottom wall of the casing 10. As can be seen best in FIG. 2, a bore 34 is provided in the top 12 of the casing for interconnecting the bellows chamber 30 and a valved chamber generally indicated by the reference numeral 36 formed in a side wall of the casing. Another bore 38 is provided in the bottom wall of the casing to permit communication between the valved chamber 36 and the lower bellows chamber 32. The valved chamber 36 comprises a large diameter bore 40, and a smaller bore 42. A shoulder 44 formed between the bores 40 and 42 serves as a seat which cooperates with the tapered end 45 formed on a valve stem 46 to restrict an orifice 47. The stem 46 is carried by a set screw 48 that may be adjusted in the threads 50 to vary the orifice 47 manually. A screw 52 which closes the upper end of the valved chamber 36 is removable to permit this adjustment. The bore 38, which extends to the edge of the bottom of the casing 10 to permit drilling, is closed at its outer end by a set screw 54. A bore 56, provided in the top of the casing to permit drilling of the bore 34, is closed by a set screw 58.

The two bellows 26 and 28, and the bores 34, 38, 40 and 42 connecting them, are filled with the silicone damping fluid. The shoulder 44 is formed of a material having a relatively low linear coefficient of expansion while the stem 46 is made of a material having a high coefficient of expansion, or vice versa. This feature together with the tapered end 45 formed on the stem 46, and the shape of the shoulder 44 cooperate to control automatically the flow of fluid between the bellows 26 and 28, thereby providing minimum dependence of the flow of the fluid on the changes in viscosity of the fluid. In this manner, compensation for changes in the viscosity of the damping fluid is accomplished by the differential expansion between the shoulder 44 and the stem 46.

An end of a light weight contact arm 60 is received in a hole provided in the mass 18. The arm is insulated from the mass by a liner 62 of insulating material. At the other end of the arm 60 there is formed a contact 64 which slides over a resistance winding carried on a strip 66 mounted in the casing 10. The strip may be copper, coated with formvar. Electrical connections are made to the contact arm 60 and the upper and lower ends of the winding 65 by leads 68, 70 and 72, respectively. A number of solder terminals 74 of a commercially available type are provided for making connections through the casing 10 to the leads while maintaining the sealed condition of the casing 10. Variations in the resistance between the contact arm 60 and either end of the winding will provide indications of accelerations to which the mass 18 is subjected.

Figure 3:
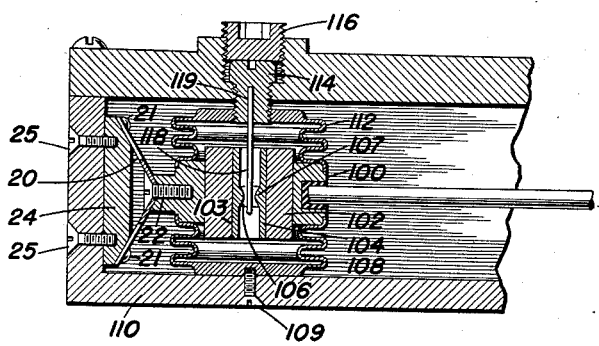
FIG. 3 is a partial vertical sectional view along the longitudinal axis of a modified form of the invention.

In the modified form of the invention shown in the sectional view of FIG. 3, the damping system for the mass is entirely enclosed within the two bellows and the mass to which they are attached. A seismic mass 100 is provided with a tungsten insert 102 thereby increasing the density of the mass. A cylindrical opening 103 is provided in the insert 102 and a sleeve 104 is fitted into the opening. A restricted orifice 106 is formed by a protuberance 107 provided on the inner surface of the sleeve 104. A bellows 108 is sealed at one end to the bottom surface of the mass 100, and has its other end attached by means of a screw 109 to the bottom of a casing 110. A second bellows 112 is sealed to the upper surface of the mass 100 and is fastened to the top of the casing 110 by means of a screw 114 threaded through the casing and into the closed end fold of the bellows 112. The opening provided in the top of the casing for the screw 114 is closed at its outer end by a set screw 116. A rod 118 is supported from the screw 114 by having one end received in a hole 119 provided in the screw. The rod 118 may be made of a material having a high linear coefficient of expansion, while the protuberance 107 may be made of a material having a low coefficient of expansion, or vice versa, so that the orifice 106 is determined by the differential expansion of these parts. The variations of the orifice with changes in temperature will compensate for changes in viscosity of the damping fluid.

In general, it is believed that the advantages of the present accelerometer and its mode of operation are apparent from the preceding description, and require only a brief statement here. The angle spring 20 for pivotally mounting the seismic mass provides a minimum moment arm between the center of rotation and the center of the respective masses. This permits maximum mechanical amplification of the motion of the mass at the potentiometer contact. As was pointed out previously, the evacuated bellows 16 will compensate for changes in volume in the silicone damping fluid due to changes in temperature while compensation for changes in viscosity due to changes in temperature is accomplished for by using the differential expansion of dissimilar materials to control the flow of damping fluid.

Obviously many other modifications and variations of the present invention are possible in the light of the above teachings. It is therefore to be understood that within the scope of the appended claims the invention may be practiced other than as specifically described.

What is claimed is:

1. An accelerometer comprising a sealed casing containing damping fluid, a mass pivotally supported on a wall of said casing, a resistance winding in said casing, an elongated arm carried by said mass, said arm having a contact adapted to slide along said winding, evacuated means in said casing for compensating for changes in volume of the fluid contained therewithin, and an arrangement for damping the motion of said mass, said arrangement including a pair of expansible chambers abutting the opposite sides of said mass, said chambers being filled with damping fluid, a passageway interconnecting the chambers to permit the flow of said damping fluid between them and means in said passageway for compensating for changes in viscosity of said damping fluid.

2. An accelerometer comprising a sealed casing containing damping fluid, a mass pivotally supported on a wall of said casing, spring means mounting said mass, a resistance winding in said casing, an elongated arm carried by said mass, said arm having a contact adapted to slide along said winding, evacuated means in said casing for compensating for changes in volume of the fluid contained therewithin, and an arrangement for damping the movement of said mass, said arrangement including a pair of expansible chambers adjacent the mass, damping fluid in said chambers, and means including a restricted orifice interconnecting the chambers to permit the flow of damping fluid between them.

3. An accelerometer comprising a sealed casing containing damping fluid, a mass supported for restricted motion in said casing, a spring attached to said casing and said mass, a first expansible bellows attached between one side of said mass and said casing, a second bellows attached between the opposite side of said mass and said casing, damping fluid in said bellows, a third bellows in said casing, said third bellows being evacuated to provide compensation for changes occurring in the volume of the fluid contained within said casing, and an arrangement interconnecting said bellows to permit the flow of damping fluid therebetween, said arrangement including means for compensating for changes in viscosity of said damping fluid.

4. An accelerator comprising a sealed casing having damping fluid therein, a mass pivotally supported in said casing, an angle spring attached to said casing and said mass, means mounted in said casing for compensating for changes in volume in the damping fluid, a first bellows mounted between one side of said mass and said casing, a second bellows mounted between the opposite side of said mass and said casing, damping fluid in said bellows, and means associated with said bellows for compensating for changes in viscosity of the damping fluid.

5. An accelerometer as recited in claim 4, wherein said means associated with said bellows includes an orifice formed by the differential expansion of two materials having different coefficients of expansion.

6. An accelerometer as recited in claim 4, wherein the means associated with said bellows includes a passageway in the walls of said casing interconnecting said bellows to permit the flow of damping fluid therebetween, and a restricted orifice in said passageway.

7. An accelerometer as recited in claim 4, wherein the means associated with said bellows includes a passageway interconnecting said bellows, said passageway being formed in said mass, and a restricted orifice in said passageway.

References Cited in the file of this patent

UNITED STATES PATENTS

| 2,317,028 | Chappell et al. | Apr. 10, 1943 |
| 2,332,994 | Draper et al. | Oct. 26, 1943 |
| 2,334,018 | Mayne | Nov. 9, 1943 |
| 2,484,165 | Hathaway | Oct. 11, 1949 |